Sept. 26, 1939.                W. C. COLEMAN                2,174,055
                 SAFETY CUT-OFF DEVICE FOR FUEL SUPPLY LINES
                 Filed April 25, 1938           2 Sheets-Sheet 1
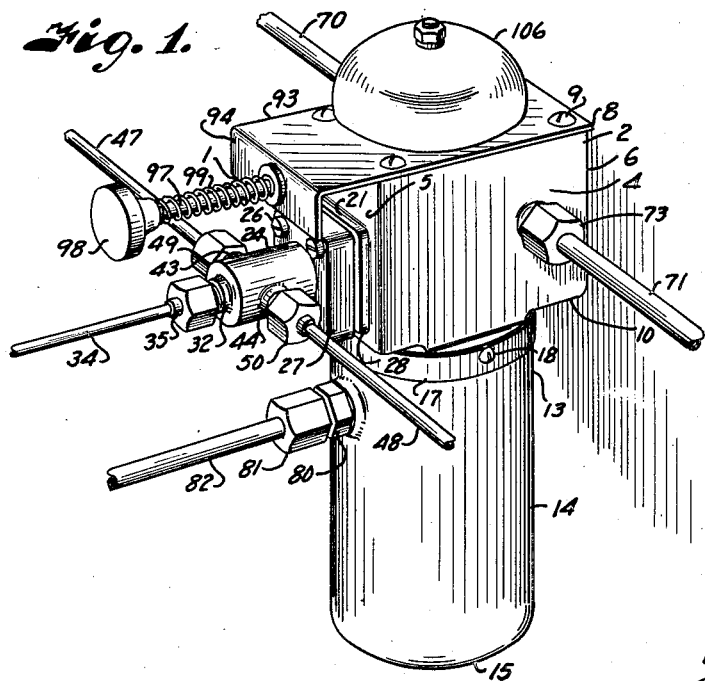
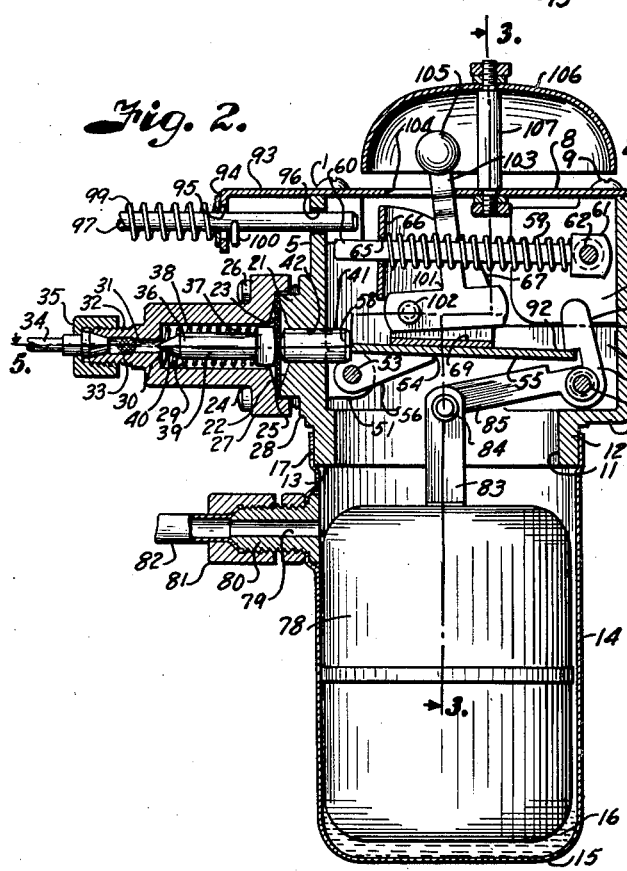
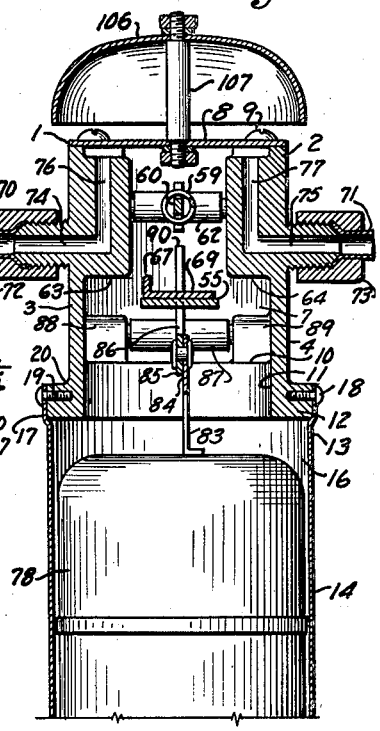
INVENTOR
William C. Coleman.
BY
ATTORNEY

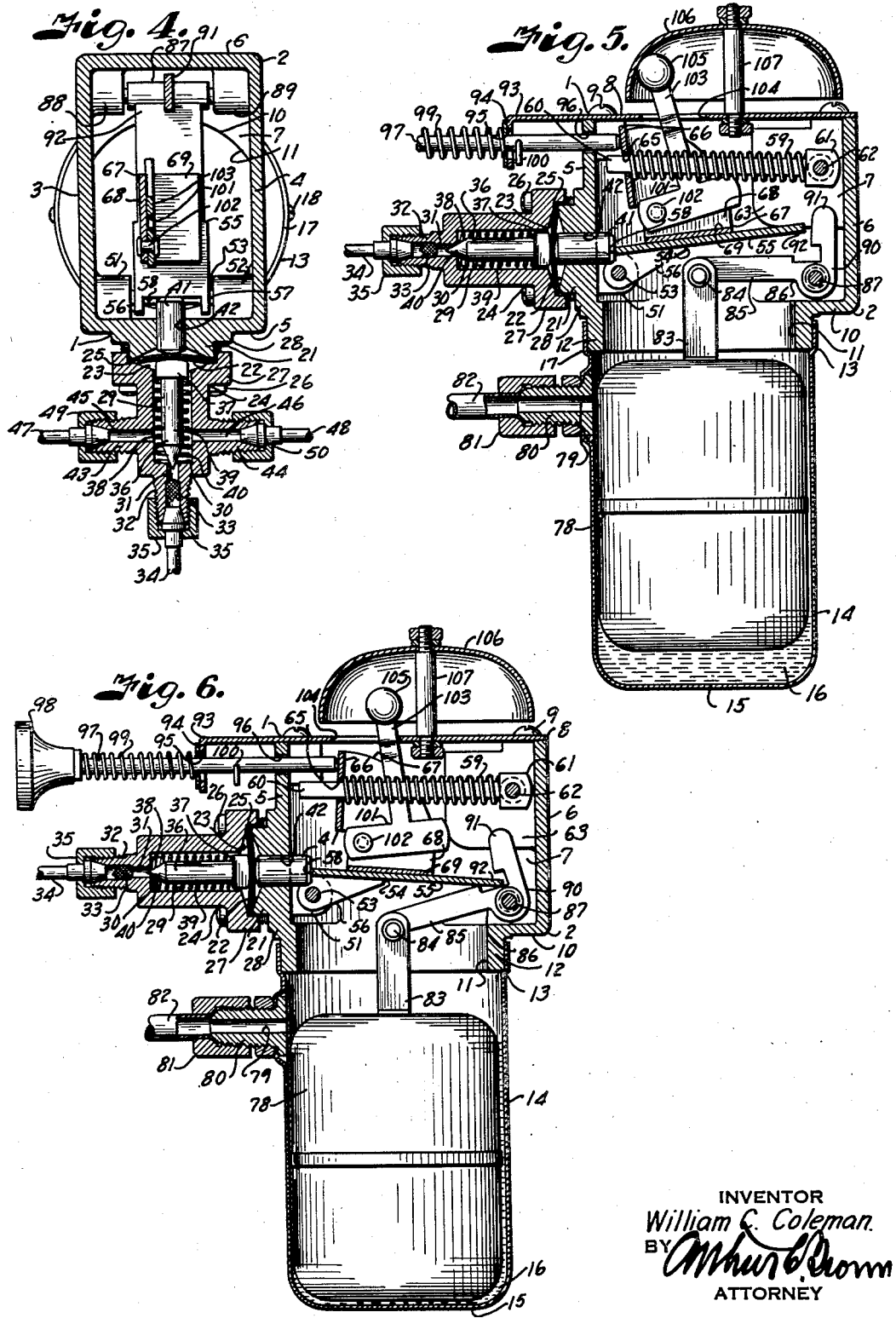

Patented Sept. 26, 1939

2,174,055

UNITED STATES PATENT OFFICE 2,174,055

SAFETY CUT-OFF DEVICE FOR FUEL SUPPLY LINES

William C. Coleman, Wichita, Kans., assignor to The Coleman Lamp and Stove Company, Wichita, Kans., a corporation of Kansas Application April 25, 1938, Serial No. 204,213

11 Claims. (Cl. 137—68)

This invention relates to a fuel cut-off device particularly for use in connection with liquid fuel systems wherein a liquid fuel is delivered from an outside source into a home for consumption in a gas burning appliance, such as a cook stove, heater, or the like.

In systems of this character it is necessary that the liquid fuel be completely converted to a gaseous or an atomized form, otherwise unconverted liquid accumulates in the gas burning appliance and floods the burners. Flooding is also caused through improper operation, carelessness, or inexperience of the operator. For example, he may turn on the liquid fuel supply and forget to operate the generator or atomizer, or he may forget to light the burner, with the result that the liquid fuel flows from its source of supply into the burners. This flooding not only "messes up" the gas burning appliance but produces a fire hazard.

It is, therefore, the principal object of the present invention to provide a safety fuel cut-off device that will automatically operate to suspend flow of fuel from the supply, in case of poor vaporization, carelessness, inexperience, or other causes.

Other important objects of the invention are to provide a fuel cut-off device that is equipped with a signal for indicating to the operator when the cut-off device functions, so that his mistake may be corrected and the cut-off device reset to continue operation of the appliance; to provide an apparatus of this character for draining surplus liquid fuel to the exterior of the building in which the gas appliance is installed; to provide a cut-off device that is automatically flushed of collected liquid incidental to resetting thereof; to provide a cut-off device which is leak-proof and entirely free of packing, stuffing boxes, and the like; to provide a cut-off device constructed to serve a plurality of gas burning appliances; to provide a continuously open drain to the exterior of the building to drain all surplus liquid from the system should the cut-off device fail to operate; and to provide a cut-off device that is adapted to be periodically flushed of collected liquid to prevent accumulation thereof incidental to normal operation of the gas burning appliance with which it is associated.

In accomplishing these and other objects of the invention, as hereinafter pointed out, I have provided improved details of structure, the preferred form of which is illustrated in the accompanying drawings, wherein:

Fig. 1 is a perspective view of a fuel cut-off device constructed in accordance with the present invention.

Fig. 2 is a vertical section through the device showing the fuel valve in open position and the tripping mechanism therefor in latched position.

Fig. 3 is a section on the line 3—3 of Fig. 2.

Fig. 4 is a horizontal section on the line 4—4 of Fig. 2.

Fig. 5 is a section similar to Fig. 2 but showing the tripping mechanism in unlatched position to close the valve and sound the signal.

Fig. 6 is a similar view showing the parts when being moved to latched position.

Referring more in detail to the drawings:

1 designates a fuel cut-off device constructed in accordance with the present invention and which includes a housing 2 having spaced side and end walls 3—4 and 5—6 to form an enclosed compartment 7 adapted to contain the tripping mechanism later described. The top of the compartment is closed by a plate 8 that overlaps the upper edges of the side walls and is secured thereto by fastening devices, such as screws 9. The housing includes a bottom 10 having an opening 11 therein that is circumscribed by a depending flange 12 for affixing a float chamber 13.

The float chamber 13 includes a cup-like member having a cylindrical wall 14 and an integral bottom 15 to form a liquid collecting sump 16. The upper rim of the wall 14 has an outwardly offset flange 17 which telescopes over the depending flange 12 and is secured thereto by fastening devices, such as screws 18, having threaded shanks 19 extending through suitable slots in the flange 17 and into threaded sockets 20 provided in the flange 12.

Formed on the exterior side of the wall 5 is a boss 21 having a concave 22 cooperating with a similar concave 23 of a valve housing 24 to mount a flexible diaphragm or partition 25. The partition 25 is preferably formed of one or more flexible metal disks having their peripheries clamped between the periphery of the boss 21 and the peripheral edge of the concave 23, as clearly shown in Figs. 2, 5 and 6, by means of screws 26 extending through a flange 27 on the valve housing 24 and into threaded sockets formed in lateral extensions 28 of the boss 21. The valve housing has a bore 29 extending inwardly from the concave 23 and which terminates in a spring seat 30 encircling a port 31 that is provided in a threaded neck 32 extending axially from the outer end of the valve housing. The bore 31 of the neck 32 is counterbored at its outer end to mount a screen or filter element, indicated by the gauze 33, to screen the liquid fuel admitted to the valve housing. The liquid fuel is admitted from an outside source through a flow line 34 connected with the neck 32 by a union 35. Slidable within the bore of the valve housing is a valve member 36, having a head 37 adapted to engage the flexible diaphragm 25 under the action of a coil spring 38 that is sleeved over the stem 39 and has one end engaging against the head and its opposite end against the seat 30, previously mentioned. The valve stem 39 terminates in a cone-shaped end 40 that is adapted to close the port 31 when the diaphragm is moved inwardly toward the concave face 23 responsive to pressure of a plunger 41 that is slidable in an axial bore 42 of the boss 21, as shown in Fig. 5. The plunger 41 is of sufficient length to engage the side of the diaphragm adjacent the cavity 25 and project inwardly of the housing 2 when the valve is held in open position by the coil spring 38.

Extending laterally from opposite diametrical sides of the valve housing are externally threaded branch outlets 43 and 44 that are provided with axial ports 45 and 46 communicating with the interior of the valve housing for the discharge of liquid fuel through flow lines 47 and 48 leading to the burners of one or more gas burning appliances, such as a cook stove (not shown), the lines being connected by unions 49 and 50. It is thus apparent that liquid fuel is free to flow from the source of supply through the lines 34 and through the valve housing to the burners by way of the lines 47 and 48 as long as the valve is unseated, but when the valve is closed flow of liquid fuel is suspended to the gas burning appliances.

Attention is directed to the fact that the diaphragm 25 is sufficiently flexible to allow freedom of movement of the valve upon actuation of the plunger 41 and to permit movement thereof by the valve member responsive to expansion of the spring 38 when the plunger is free to return to normal position, as now to be described. Extending inwardly from the wall 5, on opposite sides of the plunger 41, are bosses 51 and 52 supporting a cross shaft 53 on which is pivotally mounted a valve actuating lever 54. The lever 54 includes a plate-like tongue 55, having depending ears 56 and 57 hingedly mounted on the shaft 53 so that the adjacent end edge 58 of the tongue 55 is in position to engage the inner end of the plunger 41, the shaft 53 being located a distance below the axis of the plunger to provide sufficient leverage for the tongue to move the plunger when the tongue is swung upwardly by a spring 59.

The spring 59 is sleeved over a guide rod 60, having a head 61 that is pivotally mounted on a pin 62 having its ends fixed in bosses 63 and 64 projecting inwardly from the side walls 3 and 4, as best illustrated in Fig. 3, and which are located adjacent the upper portion of the end wall 6. The opposite end of the rod 60 is guidingly supported in an opening 65 in an abutment flange 66 of a bracket-like arm 67 comprising a part of the lever 54. The bracket-like arm 67 includes an arcuate shaped plate 68 terminating at its base in an attaching flange 69 that is fixed to the tongue 55, the abutment flange 66 being arranged at substantially 90° to the attaching flange 69, as clearly shown in Fig. 2.

With the spring 59 bearing against the head 61 and against the flange 66, the lever 54 is moved in a clockwise direction, to cause the end 58 thereof to move the plunger 41 against the diaphragm and the diaphragm against the head of the valve 36 to seat the valve against action of the valve spring 38, the spring 59 preponderating over the spring 38.

Excess fuel from the heating appliance is delivered to the safety cut-off device through pipes 70 and 71 that are connected by unions 72 and 73 with threaded bosses extending from the sides 3 and 4 of the housing in line with the inner bosses 63 and 64. Communicating with the pipes and extending through the respective bosses are channels 74 and 75, having risers 76 and 77 opening into the interior of the housing through the bosses 63 and 64 as clearly shown in Fig. 3. The risers 76 and 77 form liquid fuel traps to prevent escape of vapor from the pipes 70 and 71. The excess fuel overflows from the upper ends of the risers and into the float chamber to collect therein for actuating a float 78 which trips the valve actuating lever.

The float 78 is preferably light weight and of a size substantially filling the float chamber so that it is closely guided therein and acts as a plunger to displace the collected fluid when the float is depressed, the displaced fluid overflowing through a port 79 that is provided in a fitting 80 fixed to the upper portion of the float chamber. Connected with the fitting by a union 81 is an overflow pipe 82 leading to the exterior of the building wherethrough excess liquid is carried away as later described. The float 78 is normally suspendingly carried upon a stem 83 that is pivotally connected, as at 84, with the arm 85 of a bell crank latch 86. The latch 86 is pivotally mounted on a cross pin 87, having its ends mounted in bosses 88 and 89 extending inwardly from the side walls of the housing. The other arm 90 terminates in a latch-shaped head 91 that is adapted to engage over the free end 92 of the tongue 55 to restrain the tongue from movement by the spring 59, in which position the valve spring is free to open the valve so as to permit flow from the fuel line to the branches leading to the respective gas burning appliances.

In order to set the latch, the plate 8 is provided with a forwardly extending portion 93 having a depending flange 94. The flange 94 is provided with a bearing opening 95 cooperating with an aligning bearing opening 96 in the end wall 5 of the housing to mount a push rod 97. The push rod 97 extends forwardly from the cut-off device and has a knob or push button 98. The opposite end of the rod projects into position for abutment with the flange 66 of the lever arm 67 to effect swinging movement of the valve actuating lever into position for effecting latching of the tongue portion thereof with the latch, as shown in Fig. 2. The push rod is normally retained in retractive position by a coil spring 99 that is sleeved thereon and has one end bearing against a washer seated on the depending flange 94 and its opposite end bearing against the push button 98. The rod is retained in limited retractive movement by a pin 100 extending through the rod and engaging the rear side of the flange, as best shown in Fig. 2.

The valve actuating lever carries a bell crank 101 that is pivoted to the arm 67 by a pin 102. The bell crank has an upwardly extending arm 103 projecting through a slot 104 in the plate 8 and which carries a clapper 105 that is adapted to engage a sounding device, such as a bell 106, when the safety device is actuated through the float mechanism. The bell 106 is supported on a post 107 carried by the plate 8, as shown in Fig. 2.

A safety device constructed and assembled as described operates in the following manner:

The safety device is set to open the valve 36 by pushing on the button 98 to move the push rod into engagement with the valve actuating lever to move the tongue thereof into latch engagement with the latch head 91, the latch head yielding sufficiently to permit passage of the tongue past the hook portion thereof. This movement of the valve operating lever moves the plunger engaging portion of the tongue away from the plunger 41 so that the valve spring 38 comes into play for opening the valve. Fuel is then free to flow to the respective fuel burning appliances through the branch lines 47 and 48. Assuming that there is an excess flow of liquid to the gas burning appliance, the excess fuel will flow through the line 70 or 71 from that appliance into the housing 2, through the ports 74 and 75 for collection in the bottom of the float chamber. When there is sufficient liquid in the float chamber to raise the float, the float raises the arm 85 of the latch lever to release the head thereof from engagement with the tongue. Since the spring 59 has been loaded upon latching of the lever, the spring snaps the lever in an anticlockwise direction, Fig. 2, to bring the clapper in engagement with the bell, sounding the signal, and at the same time the engaging portion of the tongue moves the plunger 41 into shifting engagement with the diaphragm to move the valve to seating position against action of the spring 38. The valve 36 therefore closes flow through the lines leading to the respective gas burning appliances to prevent flooding of the burners thereof, as above pointed out. It is necessary for the operator to then correct the error of operation, or difficulty causing flooding of the gas heating appliance. The button 98 is then pressed to shift the push rod against the valve actuating lever to move the tongue downwardly, as shown in Fig. 6. Movement of the tongue engages the bell crank arm 86 to depress the float in the collected liquid to displace the liquid above the float so that it flows out through the overflow pipe 62. Upon release of the lever, the spring 59 returns the tongue into latching engagement with the latch head 91 which holds the tongue in depressed position, so that the valve spring 38 is free to reopen the valve, again establishing flow of liquid to the respective appliances. If the operator has failed to correct his error or the cause tending toward flooding, excess liquid again accumulates in the float chamber to trip the valve closing mechanism and to effect sounding of the alarm.

A small amount of fuel may collect within the float chamber on each starting of the gas appliance. It is therefore desirable to periodically flush the float chamber by pressing upon the button 98. This moves the valve actuating lever against tension of the spring 59 to move the float so that the liquid is displaced through the overflow pipe. This movement of the float moves the latch lever so that the latch remains in position to engage the tongue and the valve is not tripped or the bell sounded. In case the mechanism should fail to operate any excess fuel running into the safety device will fill up to the level of the overflow and be discharged to the exterior of the building through the overflow pipe.

From the foregoing it is obvious that I have provided a safety cut-off device which is of simple construction and readily operates with a small flow of fuel to shut off the main fuel supply before flooding can occur in the gas burning appliance. Operation of the cut-off also sounds the alarm to indicate that the cut-off has taken place. It is also obvious that the cut-off device is in a closed system and is open to atmosphere only through the overflow pipe which extends exteriorly of the building in which the gas burning appliances are installed. The collected fuel in the safety cut-off device therefore cannot evaporate into the building nor can it be exposed to an open flame. It is also obvious that there is no direct connection between the safety cut-off device and the fuel shut-off valve as this connection is completely blocked by the flexible diaphragm. There is therefore no possibility of flash back through the safety device into the fuel delivery line.

What I claim and desire to secure by Letters Patent is:

1. A safety cut-off device for fuel lines including a housing, a fuel cut-off valve connected with the housing, a trip lever in the housing to effect closing said valve, means in the housing for latching said lever in valve open position, means for tripping said latching means, resetting means engaging the trip lever for reengaging the latching means with said lever, a signal, and means connected with said resetting means of the trip lever for sounding the signal upon release of the latching means.

2. A safety cut-off device including a housing, a float chamber connected with the housing, a fuel cut-off valve connected with the housing, a trip lever in the housing for actuating said valve, means in the housing for latching said lever in valve open position, a float in the float chamber, a drain line connected with the float chamber, means connecting the float with said latching means and engageable by the trip lever, resetting means engageable with the trip lever for reengaging the latching means with said lever and submerging the float in said float chamber to displace liquid collecting therein and through said drain line, a signal, and means movable by the trip lever for actuating said signal.

3. A safety cut-off device including a housing, a trip lever pivotally supported in the housing, a plunger slidably supported in the housing and engageable by the trip lever, a shut-off valve connected with the housing and having a valve member actuated by said plunger, a flexible diaphragm between the plunger and the valve member to close communication between the shut-off valve and the housing, a spring in the housing for moving the trip lever into position for closing said valve member, latching means normally retaining the trip lever in valve open position, means responsive to collection of liquid in the housing for releasing said latching means, means for purging the collected liquid from the housing, and means responsive to purging of the collected liquid for moving the trip lever into engagement with the latching means.

4. A safety cut-off device including a housing, a trip lever pivotally supported in the housing, a plunger slidably supported in the housing and engageable by the trip lever, a shut-off valve connected with the housing and having a valve member actuated by said plunger, a flexible diaphragm between the plunger and the valve member to close communication between the shut-off valve and the housing, a spring in the housing for moving the trip lever into position for closing said valve member, latching means normally retaining the trip lever in valve open position, means responsive to collection of liquid in the housing for releasing said latching means, a signal, and a clapper for the signal pivotally supported on the trip lever and energized by release of said trip lever incidental to said liquid responsive means to indicate closing of the shut-off valve.

5. A safety cut-off device including a housing, a trip lever pivotally supported in the housing, a plunger slidably supported in the housing and engageable by the trip lever, a shut-off valve connected with the housing and having a spring pressed valve member actuated by said plunger, a flexible diaphragm between the plunger and the valve member to close communication between the shut-off valve and the housing, a spring in the housing for moving the trip lever into position for closing said valve member, latching means normally retaining the trip lever in valve open position, means responsive to collection of liquid in the housing for releasing said latching means, and means for resetting the trip lever including means for displacing the collected liquid.

6. A safety cut-off device including a housing, a trip lever pivotally supported in the housing, a plunger slidably supported in the housing and engaging the trip lever, a shut-off valve connected with the housing and having a normally open valve member actuated by said plunger, a flexible diaphragm between the plunger and the valve member to close communication between the shut-off valve and the housing, a spring in the housing for moving the trip lever into position for closing said valve member, latching means normally retaining the trip lever in valve open position, a float connected with the latching means and responsive to collection of liquid in the housing for releasing said latching means, and resetting means engaging the trip lever for depressing the float to move said latching means into reengagement with the trip lever.

7. A safety cut-off device including a housing, a trip lever pivotally supported in the housing, a plunger slidably supported in the housing and engaging the trip lever, a shut-off valve connected with the housing and having a normally open valve member actuated by said plunger, a flexible diaphragm between the plunger and the valve member to close communication between the shut-off valve and the housing, a spring in the housing for moving the trip lever into position for closing said valve member, latching means normally retaining the trip lever in valve open position, a float connected with the latching means and movable responsive to collection of liquid in the housing for releasing said latching means, resetting means adapted to depress the float to effect engagement of said trip lever with the latching means, a signal, and means connected with the trip lever for actuating the signal.

8. A safety cut-off device including a housing, a shut-off valve connected with the housing, spring pressed means in the housing retaining the shut-off valve open, a spring in the housing for closing said shut-off valve, latching means resisting action of the last named spring for retaining the spring pressed means in valve open position, means responsive to collection of liquid in the housing for releasing said latching means, and means for resetting the latching means including means for displacing said collected liquid.

9. In a safety cut-off device, a float chamber, a float in the float chamber a drain line connected with the float chamber, a flow line for admitting a liquid into the float chamber, a signal, a spring pressed lever for actuating the signal, latch means connecting the float with said signal actuating lever, and means for selectively submerging the float in said float chamber to displace liquid collecting in the float chamber through said drain line, including means for restoring the latch means relatively to said lever.

10. In a safety cut-off device, a float chamber having a bottom and side walls, a float movable in the float chamber and having bottom and side portions closely conforming to lower portions of the side walls and bottom of the float chamber, a constantly open drain line connected with the float chamber above the bottom thereof, a flow line for admitting liquid into the float chamber, and means for selectively submerging the float into the lower portion of the float chamber to displace liquid collecting in the float chamber through said open drain line.

11. A safety cut-off device including a housing, a float chamber connected with the housing and having a bottom and side walls, a fuel cut-off valve connected with the housing, a lever in the housing for actuating said valve, means in the housing for latching said lever in valve open position, a float movable in the float chamber having side and bottom portions closely conforming to the lower portion of said side walls and bottom of the float chamber, a constantly open drain line connected with the float chamber, means connecting the float with said latching means, and means for reengaging the latching means with said lever including means for submerging the float in said float chamber to displace liquid collecting therein through said open drain line.

WILLIAM C. COLEMAN.